July 4, 1967
A. NIELSEN
3,329,244
DOUBLE-ACTING DISC-TYPE BRAKE
Filed March 28, 1966
4 Sheets-Sheet 1
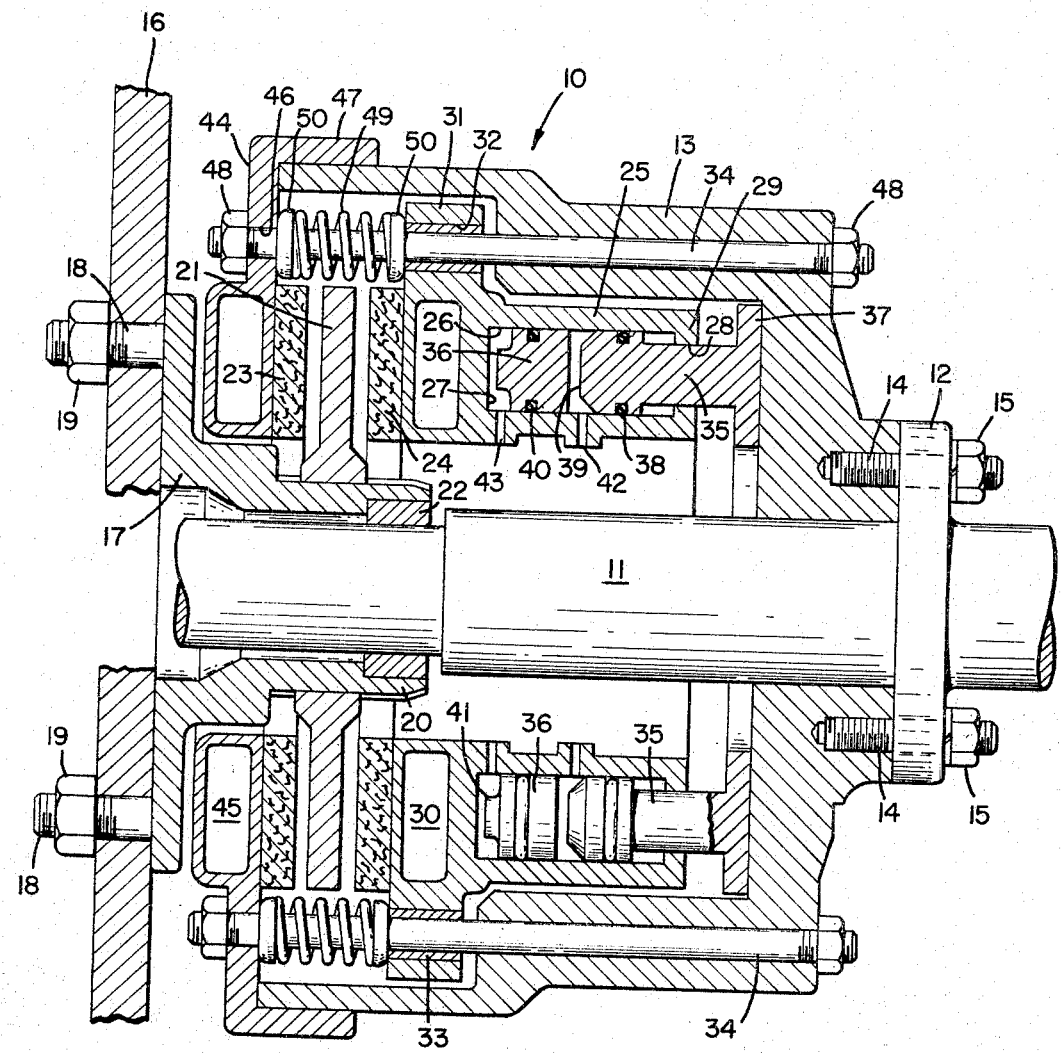
FIG_1
INVENTOR
ADOLPH NIELSEN
BY
Mellin, Moore & Weissenberger
ATTORNEYS July 4, 1967  A. NIELSEN  3,329,244
DOUBLE-ACTING DISC-TYPE BRAKE
Filed March 28, 1966  4 Sheets-Sheet 2
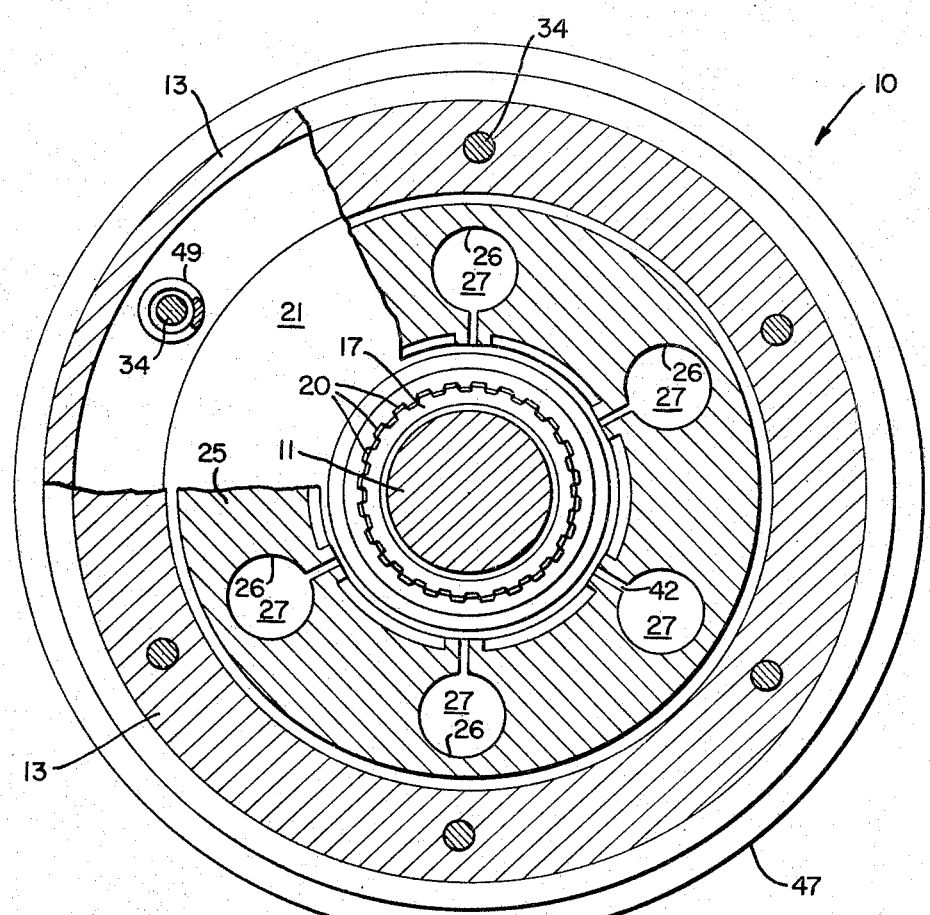
FIG_2
INVENTOR
ADOLPH NIELSEN
BY
Mellin, Moore & Weissenberger
ATTORNEYS

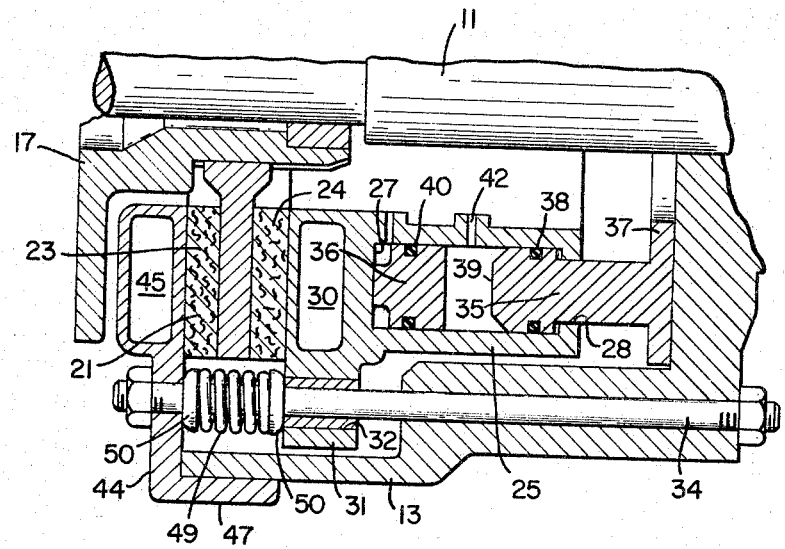
FIG_3A
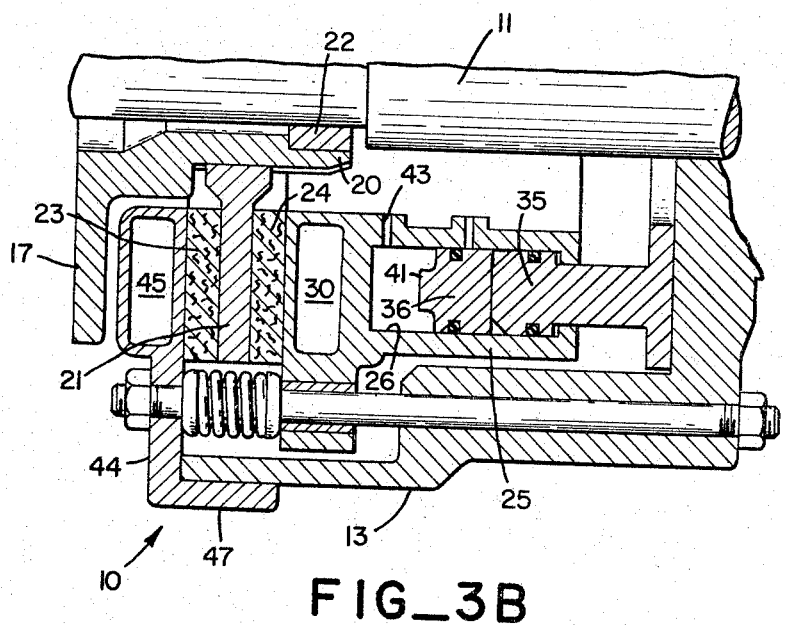
FIG_3B

July 4, 1967  A. NIELSEN  3,329,244
DOUBLE-ACTING DISC-TYPE BRAKE
Filed March 28, 1966  4 Sheets-Sheet 4
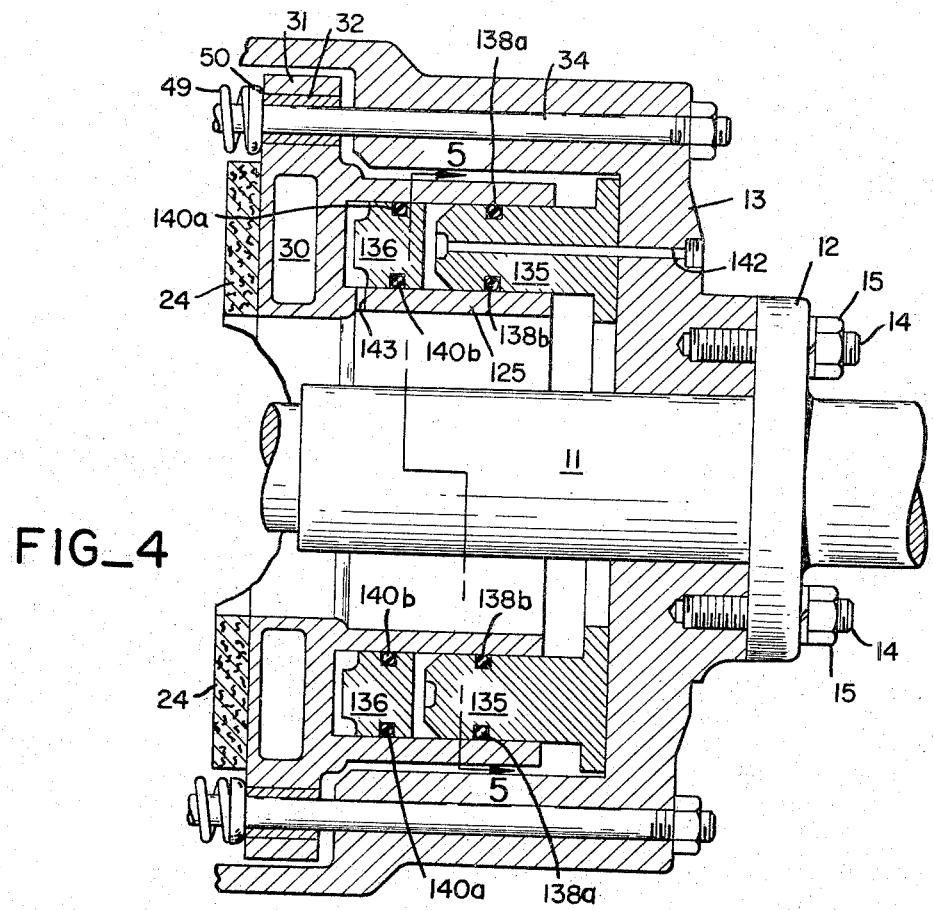
FIG_4
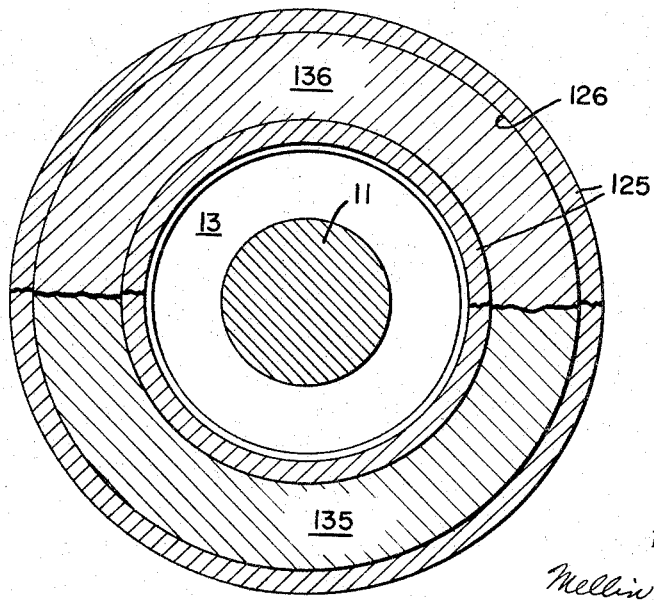
FIG_5
INVENTOR.
ADOLPH NIELSEN
BY
Mellin, Moore & Weissenberger
ATTORNEYS

3,329,244
DOUBLE-ACTING DISC-TYPE BRAKE
Adolph Nielsen, 8006 Iris St., Oakland, Calif. 94605
Filed Mar. 28, 1966, Ser. No. 537,811
6 Claims. (Cl. 188—152)

This invention relates to a hydraulically-actuated disc-type wheel brake characterized by a floating piston and a fixed piston in association with an actuating cylinder. The two pistons (floating and fixed) provide the brake with the capacity to be actuated or applied alternatively by two distinct pressure lines: a primary or service pressure line and a secondary or emergency pressure line.

Disc-type brakes have found extensive application in vehicles such as automobiles. When used in such an environment, a secondary or emergency method of applying the brakes is highly desirable. In other words, in the event that primary or service pressure is lost, due for example, to a break in the hydraulic fluid service pressure line from the master cylinder to the brake, a secondary or emergency method of applying the brake is highly desirable.

Accordingly, it is an object of the present invention to provide a disc-type brake with the capacity to be actuated alternatively by two distinct pressure lines.

It is a further object to provide a double acting brake as described above which may be cooled by circulating a coolant in heat conductive relationship to the braking or friction surfaces.

It is a further object to provide a double-acting disc-type brake which is compactly arranged with the elements thereof spaced circumferentially about the wheel axle.

Each of the above objects is fulfilled in the specific embodiment which appears in the drawings, wherein:

FIG. 1 is a vertical sectional view of the brake;

FIG. 2 is a sectional view of the brake taken on the line 2—2 of FIG. 1;

FIG. 3A is a partial vertical sectional view and shows the brake applied by means of primary or service pressure; and FIG. 3B is a partial vertical sectional view and shows the brake applied by means of secondary or emergency pressure;

FIG. 4 is a partial vertical section of a second embodiment of the brake. The elements positioned outwardly from the inner braking surface are not shown since they are identical to the elements shown in FIG. 1; and FIG. 5 is a sectional view taken on the line 5—5 of FIG. 4.

The design of the present invention may be conveniently understood with reference to FIGS. 1 and 2. The brake mechanism 10 is shown mounted to dead axle 11 at collar 12 formed integrally with axle 11. Brake hub 13 is secured to collar 12 by means of studs 14 and nuts 15. Brakehub 13 is accordingly stationary.

Wheel hub 16 is mounted to disc hub 17 by means of studs 18 and nuts 19. Disc hub 17 is splined at 20 as best seen in FIG. 2. Brake disc 21, which constitutes a braking member, is mated with spline 20 and, accordingly, brake disc 21 is axially slidable on spline 20 but is not rotatable with respect to disc hub 17. Wheel hub 16, disc hub 17 and brake disc 21 rotate with the vehicle wheel (not shown) on bearing 22 (and additional bearings not shown) about dead axle 11.

A pair of disc shaped braking surfaces 23 and 24 is mounted axially on opposite sides of braking member 21. Braking surfaces 23 and 24 are rotationally fixed to axle 11 through brake hub 13. Outer braking surface 23 is axially fixed and, accordingly, is totally stationary with respect to axle 11. Inner braking surface 24, though rotatably fixed to axle 11, is not axially fixed. Inner braking surface 24 is axially reciprocable and provides the means for actuating the brake mechanism. Thus, with braking member 21 rotating, braking surface 24 is urged into engagement with braking member 21 and braking member 21 is caused to slide on spline 20 into engagement with outer braking surface 23. The braking action is achieved as both inner and outer braking surfaces 23 and 24 engage and pinch braking member 21. The actuating mechanism for moving braking surface 24 into engagement with braking member 21 is described immediately below.

The actuating mechanism is characterized by a cylinder houisng 25 which defines a plurality of circumferentially spaced cylinders 26, best seen in FIG. 2. In the preferred embodiment, six cylinders 26 are provided. Each of the cylinders 26 is disposed with its axis parallel to the axis of axle 11 and each cylinder has a cylinder head 27 and an opening 28 defined by an internal flange 29.

Cylinder housing 25 also defines a circular cavity 30 and an external flange 31. External flange 31 defines a plurality of circumferentially spaced openings 32 which accommodate bearings 33.

Cylinder housing member 25 is mounted about axle 11 on guide pins 34 which extend through brake hub 13 and bearings 33. Cylinder housing 25 is accordingly reciprocable on guide pins 34. With inner braking surface 24 secured to cylinder housing 25, movement of cylinder housing 25 toward brake disc 21 provides the braking action.

A fixed piston 35 and a floating piston 36 are disposed in each of the cylinders 26. Each fixed piston 25 is integrally formed with a common disc shaped flange 37 which is secured to brake hub 13. Fixed piston 35 has an O-ring 38 and a beveled head 39. Floating piston 36 is provided with an O-ring 40 and a convex protuberance 41.

A plurality of service pressure fittings 42 penetrate the inner wall of cylinder housing 25 to communicate with each cylinder 26. A similar series of fittings 43 is provided for emergency pressure. It will be noted that service pressure fitting 42 communicates with cylinder 26 between fixed piston 35 and floating piston 36. Emergency pressure fitting 43 communicates with cylinder 26 between cylinder head 27 and floating piston 36.

Outer braking surface 23 is mounted to a generally disc-shaped member 44 which defines cavity 45, a mounting aperture 46 and a collar 47. Member 44 is mounted to brake hub 13 by means of guide pin 34 and nuts 48.

A spacing is maintained between braking surfaces 23 and 24 to thereby insure disengagement of the brake, except when actuated by hydraulic pressure, by means of coil spring 49 which compresses against member 44 and cylinder housing 25 through seats 50.

Cavities 30 and 45 are contiguous with braking surfaces 24 and 23 respectively and are accordingly in heat conductive relationship therewith. The brake may be cooled by circulating a coolant such as water into and out of cavities 30 and 45 which are circular in configuration.

The operation of the brake described may be conveniently understood with reference to FIGS. 3A and 3B. FIG. 3A shows the brake actuated through the use of service pressure. Pressure is applied through passage 42 and floating piston 36 is forced into contact with cylinder head 27. Cylinder housing 25 and braking surface 24 is accordingly forced, against the resiliency of spring 49, into engagement with brake disc or braking member 21. Brake disc 21 is forced axially toward outer braking surface 23 and slides into engagement therewith because of its splined relationship with brake hub 17. With continued application of service pressure between fixed piston 35 and floating piston 36, braking surfaces 23 and 24 engage opposite sides of brake disc 21 and relative rotation between brake disc 21 and braking surfaces 23 and 24 is decreased. Rotation of the wheel (not shown) is accordingly eventually stopped.

With the release of service pressure, spring 42 urges braking surface 24 out of engagement with brake disc 21 and cylinder housing 25 moves back into the position shown in FIG. 1.

In the event of a loss of service pressure, the brake may be actuated by means of emergency pressure as shown in FIG. 3B. Emergency pressure introduced into cylinders 26 through passage 43 forces floating piston 36 into engagement with fixed piston 35 and braking surfaces 23 and 24 into engagement with brake disc 21. It will be noted that the application of emergency pressure is not affected by a rupture in the service pressure line since floating piston 36 isolates the service pressure line from the emergency pressure line.

Heat generated due to the friction bewteen rotating brake disc 21 and non-rotating braking surfaces 23 and 24 is dissipated through the use of coolant circulated through cavities 30 and 45.

Variations may be made in the design shown without departing from the scope of the invention. For example, one annular or ringed piston might be used in place of each of the fixed pistons 35 and a second used to replace floating pistons 36. Such a variation is shown in FIGS. 4 and 5.

With reference to FIG. 4, the brake shown includes (like the brake of FIG. 1) dead axle 11, collar 12, brake hub 13, studs 14, and nuts 15. The brake also includes braking surface 24, cavity 30, flange 31, bearings 32, pins 34, springs 49 and spring seats 50. The elements positioned outwardly from the braking surface 24 (or to the left of braking surface 24 as viewed in FIG. 4) are identical to the corresponding elements shown in FIG. 1. They have, accordingly, been omitted.

The embodiment of FIGS. 4 and 5 differs from the embodiment of FIGS. 1–3 in that the cylinder and pistons are annular. Thus cylinder housing 125 extends circumferentially around dead axle 11 to define cylinder 126, as best seen in FIG. 5. Fixed piston 135 and floating piston 136 are similarly annular. O-rings 138a and 138b and 140a and 140b are provided in association with fixed piston 135 and floating piston 136 respectively. A service pressure passage 142 and an emergency pressure passage 143 are provided for actuating the brake.

The embodiment of FIGS. 4 and 5 operates identically to the embodiment of FIGS. 1–3. Service pressure introduced into cylinder 126 through service pressure passage 132 actuates the brake under normal operating conditions. In the event of an emergency, pressure introduced through emergency pressure passage 143 actuates the brake.

Variations may be made in the form of the invention shown and described without departing from its scope.

I claim:
1. A double-acting, disc-type wheel brake comprising:
a disc-shaped braking member spaced from and axially mounted to said wheel for rotation therewith,
a pair of disc-shaped braking surfaces non-rotatably and axially mounted on opposite sides of said braking member,
means for selectively engaging the opposite sides of said braking member with said braking surfaces to thereby decrease relative rotation thereof and brake said wheel,
said means comprising a fixed piston disposed with the axis thereof parallel with the axis of said wheel, a cylinder having an axis parallel to the axis of said wheel accommodating said fixed piston therein and having a head portion secured to one of said braking surfaces, a floating piston in said cylinder axially disposed between the head portion of said cylinder and said fixed piston,
means for introducing fluid pressure into said cylinder between said fixed piston and said floating piston, and
means for introducing fluid pressure into said cylinder between the head portion thereof and said floating piston.
2. The brake of claim 1 and means for cooling said braking surfaces.
3. The brake of claim 1 and resilient means for urging said braking surfaces out of engagement with said braking member.
4. The brake of claim 1 wherein said braking member is splined to the hub of said wheel and said braking member, braking surfaces, cylinders and pistons circumscribed the axle of said wheel.
5. The brake of claim 2 wherein said means for cooling said braking surfaces comprises a circular cavity in heat conductive realtionship with each of said braking surfaces, and means for circulating a coolant in said cavity.
6. The brake of claim 5 wherein said braking member is splined to the hub of said wheel; said braking member, braking surfaces, cylinders, and pistons circumscribe the axis of said wheel; and resilient means for urging said braking surfaces out of engagement with said braking member.

References Cited
UNITED STATES PATENTS 3,094,193  6/1963  Dowell _____ 188—152 X
3,160,238  12/1964  Meyer-Jagenberg ____ 188—152

HILTON BUCHLER, *Primary Examiner.*

G. E. HALVOSA, *Assistant Examiner.*